(12) United States Patent
Inafune et al.

(10) Patent No.: US 8,922,874 B2
(45) Date of Patent: Dec. 30, 2014

(54) CASCADED OPTICAL PARAMETRIC AMPLIFIER WITH POLARIZATION EXCHANGE FOR NOISE REDUCTION

(71) Applicant: Oki Electric Industry Co., Ltd., Tokyo (JP)

(72) Inventors: Kouji Inafune, Tokyo (JP); Hitoshi Murai, Tokyo (JP); Tadashi Kishimoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 44 days.

(21) Appl. No.: 13/898,463

(22) Filed: May 20, 2013

(65) Prior Publication Data
US 2013/0314769 A1    Nov. 28, 2013

(30) Foreign Application Priority Data

May 22, 2012   (JP) ................................. 2012-116826

(51) Int. Cl.

| | | |
|---|---|---|
| G02F 1/39 | (2006.01) | |
| G02F 1/365 | (2006.01) | |
| H04B 10/291 | (2013.01) | |
| H01S 3/067 | (2006.01) | |
| G02F 1/35 | (2006.01) | |

(52) U.S. Cl.
CPC ....... H01S 3/06754 (2013.01); *H04B 2210/003* (2013.01); H04B 10/291 (2013.01); G02F 1/39 (2013.01); G02F 1/3532 (2013.01); *G02F 2001/392* (2013.01); *G02F 1/3536* (2013.01)
USPC .......................... 359/330; 359/341.1; 359/337

(58) Field of Classification Search
USPC ........................................ 359/330, 337, 341.1
See application file for complete search history.

(56) References Cited

U.S. PATENT DOCUMENTS

| | | | | |
|---|---|---|---|---|
| 5,604,618 A | * | 2/1997 | Mori et al. | ..................... 398/150 |
| 2006/0285197 A1 | * | 12/2006 | McKinstrie | ................... 359/333 |
| 2014/0043674 A1 | * | 2/2014 | Takasaka et al. | ............. 359/334 |

OTHER PUBLICATIONS

Tong et al. "Measurement of Sub-1 dB Noise Figre in a Non-Degenerate cascaded Phase-Sensitive Fibre Parametric Amplifier", in Proceedings of European Conference on Optical Communications, Vienna, Austria 2009, paper 1.1.2.*
R.Tang et al., "Gain Characteristics of a frequency nondegenerate phase-sensitive fiber-optic parametric amplifier with phase self-stabilized input", Optics Express, vol. 13, No. 26, p. 10483-10493, Dec. 26, 2005.
Zhi Tong et al., "Noise performance of optical fiber transmission links that use non-degenerate cascaded phase-sensitive amplifiers", Optics Express, vol. 18, No. 15, pp. 15426-15439, Jul. 19, 2010.

* cited by examiner

*Primary Examiner* — Eric Bolda
(74) *Attorney, Agent, or Firm* — Rabin & Berdo, P.C.

(57) ABSTRACT

An optical amplification device includes a first optical amplification portion, an intermediate portion and a second optical amplification portion. The first optical amplification portion receives input light including signal light and pump light, generates idler light as wavelength converted light based on wavelengths of the signal light and the pump light, and outputs first output light including signal light, pump light and idler light. The intermediate portion outputs second output light, and includes a demultiplexing portion that demultiplexes the first output light into signal light, pump light and idler light, a multiplexing portion that generates the second output light by multiplexing signal light, pump light and idler light, and a polarization plane adjustment portion that exchanges mutually orthogonal polarization components of idler light. The second optical amplification portion amplifies an intensity of signal light included in the second output light.

12 Claims, 4 Drawing Sheets

CASCADED OPTICAL PARAMETRIC AMPLIFIER WITH POLARIZATION EXCHANGE FOR NOISE REDUCTION

CROSS REFERENCE TO RELATED APPLICATION(S)

This application is based upon and claims benefit of priority from Japanese Patent Application No. 2012-116826, filed on May 22, 2012, the entire contents of which are incorporated herein by reference.

BACKGROUND

The present invention relates to an optical amplification device and an optical amplification method, and particularly relates to an optical amplification device and an optical amplification method that can reduce a noise figure in a wavelength band of an optical signal to be amplified.

In an optical communication network using optical fibers, an optical amplification device is installed in a communication path of an optical signal in order to amplify the intensity of the optical signal that is attenuated by transmission.

For example, an erbium doped fiber amplifier (EDFA) that utilizes an optical fiber whose core is doped with erbium ions is used as a known optical amplification device. In the EDFA, an optical signal input to the optical fiber to which excitation light is supplied is amplified by stimulated emission.

In the EDFA, light generated by spontaneous emission (spontaneous emission light) is added as noise to the optical signal. Therefore, a signal-noise ratio (SNR) of output light deteriorates compared to an SNR of input light. Note that, in the explanation below, the ratio of the SNR of the input light with respect to the SNR of the output light is also referred to as the noise figure. The noise caused by spontaneous emission light cannot be reduced to be less than the quantum limit. Therefore, in optical amplification using the known EDFA, it is not possible in principle to reduce the noise figure to be less than 2 (namely, 3 dB).

Parametric amplification is known as a technology that further reduces the noise figure when amplifying an optical signal. In parametric amplification, an optical signal (hereinafter also referred to as signal light) to be amplified and pump light are input to a non-linear optical element. Then, energy of the pump light is applied to the signal light using four-wave mixing, which is a non-linear optical effect, and thus the signal light is amplified.

A method (hereinafter, also referred to as a PIA-PSA cascade method) is proposed that uses a phase insensitive amplifier (PIA) and a phase sensitive amplifier (PSA) in an optical amplification device that utilizes parametric amplification (for example, refer to R. Tang et al., "Gain Characteristics of a frequency nondegenerate phase-sensitive fiber-optic parametric amplifier with phase self-stabilized input" Optics Express, vol. 13, no. 26, p. 10483, 2005). The PIA and the PSA each include a non-linear optical element and amplify an optical signal by parametric amplification in the non-linear optical element. Here, in the PIA, an amplification gain does not depend on the phase of the input light. Meanwhile, in the PSA, the amplification gain depends on the phase of the input light. The PSA achieves a noise figure of less than 2 (namely, 3 dB), which cannot be achieved by the known EDFA. Therefore, an optical amplification device using the PSA is attracting attention as an optical amplification device used for optical communication.

In the PIA-PSA cascade method, first, the pump light and the signal light are input to the PIA. In the PIA, the signal light is amplified, and at the same time, idler light is generated as wavelength converted light of the signal light.

Next, the pump light, the signal light and the idler light output from the PIA are input to the PSA. The non-linear optical element provided in the PSA is set such that the amplification gain is determined by a relative phase of the pump light, the signal light and the idler light. In the PSA, the signal light is amplified by the amplification gain.

SUMMARY

However, with the above-described known PIA-PSA cascade method, in the PIA, noise existing in a wavelength band of the signal light is copied to a wavelength band of the idler light. More specifically, there is a correlation between the noise existing in the wavelength band of the signal light and the noise existing in the wavelength band of the idler light. As a result, in the PSA, the noise existing in the wavelength band of the signal light is also amplified by the amplification gain of the signal light that is determined by the relative phase. Therefore, the noise figure cannot be reduced sufficiently by the known PIA-PSA cascade method.

The present invention has been made in light of the above-described problems, and it is an object of the present invention to provide an optical amplification device and an optical amplification method that can reduce a noise figure in a wavelength band of signal light in comparison to related art.

In order to achieve the above-described object, an optical amplification device according to an aspect of the present invention includes the following features.

More specifically, the optical amplification device includes a first optical amplification portion, an intermediate portion and a second optical amplification portion.

The first optical amplification portion generates idler light as wavelength converted light based on wavelengths of signal light and pump light included in input light, and outputs first output light including signal light, pump light and idler light.

The intermediate portion generates second output light by exchanging mutually orthogonal polarization components of idler light included in the first output light.

The second optical amplification portion receives the second output light and amplifies an intensity of signal light included in the second output light.

An optical amplification method according to another aspect of the present invention includes the following steps.

More specifically, first, idler light is generated as wavelength converted light based on wavelengths of signal light and pump light included in input light, and first output light that includes signal light, pump light and idler light is generated.

Next, second output light is generated by exchanging mutually orthogonal polarization components of idler light included in the first output light.

Next, an intensity of signal light included in the second output light is amplified.

In the optical amplification device and the optical amplification method according to the aspects of the present invention, the mutually orthogonal polarization components of the idler light are exchanged by the intermediate portion. At this time, in the wavelength band of the idler light, polarization components of noise are also exchanged, and thus noise of the signal light and noise of the idler light are uncorrelated. Therefore, although the signal light in the second optical amplification portion is amplified by a predetermined amplification gain, the noise is not amplified by the predetermined amplification gain. Thus, in the second optical amplification portion, the amplification gain of the noise existing in the wavelength band of the signal light is reduced. As a result, it is possible to reduce the noise figure as compared to the known PIA-PSA cascade method.

DETAILED DESCRIPTION OF THE EMBODIMENT(S)

Figure 1:
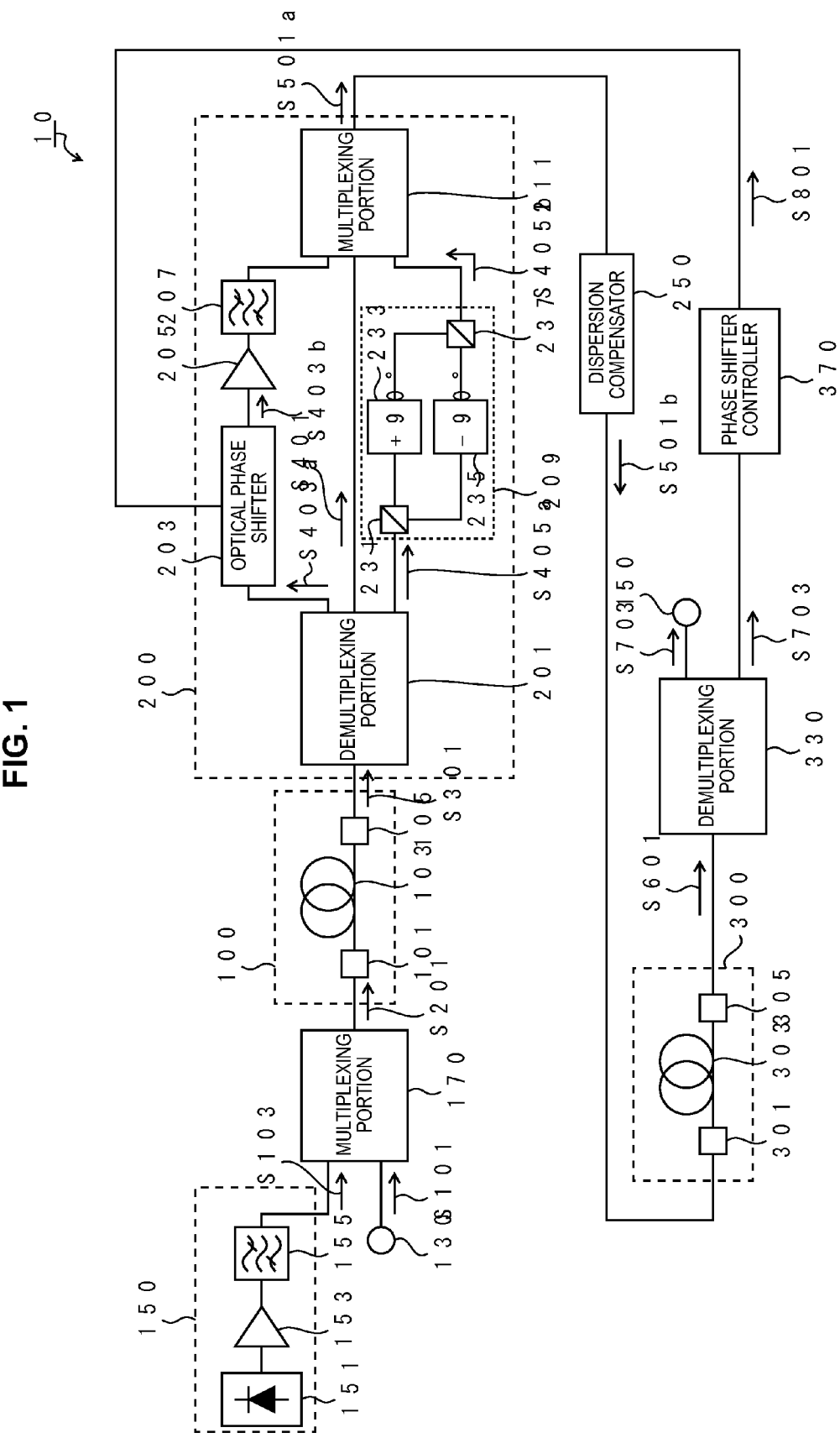
FIG. 1 is a schematic structural diagram schematically showing a first optical amplification device according to the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

First Embodiment

An optical amplification device (hereinafter referred to as a first optical amplification device) according to a first embodiment of the present invention will be explained with reference to FIG. 1 and FIGS. 2A and 2B. FIG. 1 is a schematic structural diagram schematically showing the first optical amplification device. In FIG. 1, respective structural elements are connected by lines, which schematically show transmission paths through which signals propagate. The respective structural elements may be connected by an optical fiber or an optical waveguide, for example, or may be connected by so-called free space optics.

When the first optical amplification device 10 is installed in a communication path of an optical signal in an optical communication network, for example, the first optical amplification device 10 can amplify the intensity of the optical signal. In this case, the optical signal (here, it is also referred to as signal light) to be amplified is a known optical signal that is modulated by data to be transmitted, such as a phase shift keying signal or an amplitude shift keying signal, for example. The polarization state of the signal light is stable in terms of time. Note that, if a polarization diversity structure is adopted by using two first optical amplification devices 10, it is possible to achieve polarization independence.

The first optical amplification device 10 is an optical amplification device that adopts a PIA-PSA cascade method, and includes a pump light source 150, a multiplexing portion 170, a first optical amplification portion 100 that is used as a phase insensitive amplifier (PIA), an intermediate portion 200, a dispersion compensator 250, a second optical amplification portion 300 that is used as a phase sensitive amplifier (PSA), a demultiplexing portion 330 and a phase shifter controller 370. The first optical amplification portion 100 generates idler light based on wavelengths of input signal light and input pump light. The intermediate portion 200 exchanges orthogonal polarization components of the idler light. The second optical amplification portion 300 amplifies the intensity of the signal light.

Signal light S101 (shown by an arrow S101 in FIG. 1) that is input to the first optical amplification device 10 from an input port 130 is firstly sent to the multiplexing portion 170. The multiplexing portion 170 multiplexes the signal light S101 and pump light (shown by an arrow S103 in FIG. 1). For example, a wavelength division multiplexing (WDM) coupler/divider can be used as the multiplexing portion 170.

The pump light S103 is generated by the pump light source 150.

The pump light source 150 includes, for example, a laser diode 151, an optical amplifier 153 and a band-pass filter 155. In the pump light source 150, first, the laser diode 151 generates laser diode output light having a polarization plane that matches a polarization plane of the signal light S101. Next, the intensity of the laser diode output light is amplified by the optical amplifier 153. Here, in the first optical amplification portion 100 and the second optical amplification portion 300 that will be described later, the intensity of the laser diode output light is amplified to at least a level of intensity at which parametric amplification occurs. Next, the amplified laser diode output light is sent to the band-pass filter 155. In the band-pass filter 155, a transmission wavelength is set to a wavelength band that matches a wavelength band of the pump light S103. When the signal light S101 has a wavelength band within a range from 1530 to 1565 nm, for example, it is preferable that the wavelength of the pump light S103 is set to 1525 nm or 1570 nm, for example. After noise existing outside the wavelength band of the pump light is sufficiently reduced by the band-pass filter 155, the laser diode output light is output from the pump light source 150 as the pump light S103 and is sent to the multiplexing portion 170.

The multiplexing portion 170 multiplexes the signal light S101 and the pump light S103, and outputs the multiplexed light as input light (shown by an arrow S201 in FIG. 1) that includes the signal light S101 and the pump light S103. The input light S201 is input to the first optical amplification portion 100.

The first optical amplification portion 100 generates idler light as wavelength converted light of the signal light included in the input light S201.

The PIA can be used as the first optical amplification portion 100. The first optical amplification portion 100 includes an input-side polarization plane adjustment portion 101, a non-linear optical element 103 and an output-side polarization plane adjustment portion 105.

The input-side polarization plane adjustment portion 101 adjusts the polarization planes of the signal light and the pump light included in the input light S201 such that the intensity ratio of components that are parallel to a slow axis of the non-linear optical element 103 and components that are parallel to a fast axis of the non-linear optical element 103 is 1:1. When the input light S201 is a linearly-polarized wave, a half-wave plate, for example, can be used as the input-side polarization plane adjustment portion 101. The input light S201 whose polarization plane has been adjusted is sent to the non-linear optical element 103.

The non-linear optical element 103 applies the energy of the pump light to the signal light through parametric amplification, and thereby amplifies the signal light. Further, the non-linear optical element 103 generates idler light as wavelength converted light of the signal light, based on the wavelengths of the signal light and the pump light.

If the frequency of the signal light is denoted as fs and the frequency of the pump light is denoted as fp, a frequency fi of the idler light is expressed as 2fp−fs based on four-wave mixing.

It is preferable that the non-linear optical element 103 is a highly non-linear fiber that has polarization maintaining characteristics, for example. In order to obtain a sufficient amplification gain by the parametric amplification, it is preferable that the non-linear optical element 103 has a structure in which a non-linear constant is, for example, equal to or more than $10\ W^{-1}km^{-1}$, its length is approximately 100 m to 1000 m, a zero-dispersion wavelength exists in the vicinity of the wavelength of the pump light, and a dispersion slope is small. Further, in order to compensate for polarization mode dispersion that occurs in the highly non-linear fiber, it is preferable that the highly non-linear fiber used as the non-linear optical element 103 is divided at a point at which the overall length is halved, and one of the divided halves of the highly non-linear fiber is rotated by 90 degrees and connected at the point of division.

Mixed light that includes the signal light, the pump light, and the idler light that is generated by the non-linear optical element 103 is sent to the output-side polarization plane adjustment portion 105.

The output-side polarization plane adjustment portion 105 matches the polarization planes of the signal light, the pump light and the idler light included in the mixed light with a slow axis of an input port (not shown in the drawings) of a demultiplexing portion 201, which will be described later. For example, a half-wave plate can be used as the output-side polarization plane adjustment portion 105.

The mixed light that includes the signal light, the pump light and the idler light whose polarization planes have been adjusted by the output-side polarization plane adjustment portion 105 is output from the first optical amplification portion 100 as first output light (shown by an arrow S301 in FIG. 1).

The first output light S301 output from the first optical amplification portion 100 is sent to the intermediate portion 200.

The intermediate portion 200 exchanges mutually orthogonal polarization components (here, an x component and a y component) of the idler light included in the first output light S301. Further, the intermediate portion 200 adjusts a relative phase of the signal light, the pump light and the idler light.

The intermediate portion 200 includes the demultiplexing portion 201, a multiplexing portion 211, a phase adjustment portion 203 that is provided between the demultiplexing portion 201 and the multiplexing portion 211, an optical amplifier 205, a band-pass filter 207 and a polarization plane adjustment portion 209. Here, an explanation will be given for a structure in which an optical phase shifter is provided as the phase adjustment portion 203 that can change the relative phase. Therefore, in the explanation below, the phase adjustment portion 203 is also referred to as the optical phase shifter 203.

The demultiplexing portion 201 demultiplexes the first output light S301 into signal light (shown by an arrow S401 in FIG. 1), pump light (shown by an arrow S403a in FIG. 1) and idler light (shown by an arrow S405a in FIG. 1). For example, a WDM coupler/divider can be used as the demultiplexing portion 201.

The signal light S401, the pump light S403a and the idler light S405a that have been obtained by demultiplexing are respectively sent to the multiplexing portion 211 through different paths. Each of the paths is set such that the propagation time of each light from the demultiplexing portion 201 to the multiplexing portion 211 is the same. Note that the pump light S403a is sent to the multiplexing portion 211 via the optical phase shifter 203, the optical amplifier 205 and the band-pass filter 207. The idler light S405a is sent to the multiplexing portion 211 via the polarization plane adjustment portion 209. For example, a WDM coupler/divider can be used as the multiplexing portion 211.

The optical phase shifter 203 adjusts the phase of the pump light 403a so that the relative phase between the signal light, the pump light and the idler light given by $2\phi p-\phi s-\phi i$ is constant. Note that $\phi p$ indicates the phase of the pump light, $\phi s$ indicates the phase of the signal light, and $\phi i$ indicates the phase of the idler light, respectively. The relative phase may fluctuate due to mechanical vibrations of surrounding elements, changes in ambient temperature or the like. To address this, the phase of the pump light S403a is adjusted by the optical phase shifter 203 so that the relative phase is constant. Here, the relative phase is adjusted by the second optical amplification portion 300 so that the amplification gain of the signal light is maximum, based on a control signal (shown by an arrow S801 in FIG. 1) that is sent from the phase shifter controller 370 that will be described later. Note that an optical phase shifter that uses a piezoelectric element, for example, can be used as the optical phase shifter 203.

The intensity of pump light (shown by an arrow S403b in FIG. 1) whose phase has been adjusted by the optical phase shifter 203 is amplified by the optical amplifier 205. Then, noise in a wavelength band that is outside the wavelength band of the pump light is removed by the band-pass filter 207 whose transmission wavelength is set to match the wavelength of the pump light.

Note that the optical amplifier 205 and the band-pass filter 207 can be omitted if the attenuation of the pump light S403b between the intermediate portion 200 and the second optical amplification portion 300 is small and the amplification gain of the parametric amplification can be sufficiently obtained in the second optical amplification portion 300.

The polarization plane adjustment portion 209 exchanges mutually orthogonal polarization components (here, an x component and a y component) of the idler light S405a. The polarization plane adjustment portion 209 includes, for example, a polarization beam splitter 231, a half-wave plate 233, a half-wave plate 235 and a polarization beam splitter 237. The polarization beam splitter 231 splits the x component and the y component of the idler light S405a. One of the x component and the y component corresponds to a component that is parallel to the slow axis of the non-linear optical element 103 and a non-linear optical element 303 (which will be described later), and the other polarization component corresponds to a component that is parallel to the fast axis of the non-linear optical elements 103 and 303. Next, the half-wave plate 233 provides a 90 degree polarization rotation to the one polarization component (here, the x component) light. The half-wave plate 235 provides a −90 degree polarization rotation to the other polarization component (here, the y component) light. Next, the polarization beam splitter 237 multiplexes each of the polarization component lights.

Another structure can be adopted in which a first half-wave plate is first used to rotate the polarization plane of the idler light S405a by 90 degrees and then a second half-wave plate is used to provide, between the x component and the y component, a delay time that corresponds to 180 degrees as an optical phase.

Idler light (shown by an arrow S405b in FIG. 1), for which the x component and the y component have been exchanged by the polarization plane adjustment portion 209, is sent to the multiplexing portion 211.

The multiplexing portion 211 multiplexes the signal light S401, the pump light S403b and the idler light S405b, and thereby generates second output light (shown by an arrow S501a in FIG. 1). The second output light S501a is output from the multiplexing portion 211. That is, it is output from the intermediate portion 200.

The second output light S501a output from the intermediate portion 200 is sent to the dispersion compensator 250.

The dispersion compensator 250 compensates dispersion of the second output light S501a.

In the second optical amplification portion 300 that will be described later, the signal light is amplified by an amplification gain that is based on the relative phase between the signal light, the pump light and the idler light included in the second output light S501a. Then, as described above, the phase of the pump light S403a is adjusted by the optical phase shifter 203, and thus the relative phase is adjusted by the second optical amplification portion 300 so that the amplification gain of the signal light is maximum. However, when wavelength dispersion occurs in the intermediate portion 200, the relative phase between the signal light, the pump light and the idler light included in the second output light S501a has a value that depends on the signal light. As a result, the amplification gain of the signal light in the second optical amplification portion 300 depends on the wavelength of the signal light and flat gain characteristics are not obtained. To address this, the dispersion compensator 250 is used to compensate for the wavelength dispersion of the second output light S501a, and it is thus possible to maintain the relative phase to be constant. Then, the amplification gain of the signal light in the second optical amplification portion 300 is stabilized.

The second output light (shown by an arrow S501b in FIG. 1), for which the dispersion has been compensated by the dispersion compensator 250, is input to the second optical amplification portion 300.

The second optical amplification portion 300 amplifies the intensity of the signal light included in the second output light S501b.

The second optical amplification portion 300 includes an input-side polarization plane adjustment portion 301, the non-linear optical element 303 and an output-side polarization plane adjustment portion 305. The second optical amplification portion 300 can be used as the PSA.

The input-side polarization plane adjustment portion 301 adjusts the polarization planes of the signal light, the pump light and the idler light included in the second output light S501b such that the intensity ratio of components that are parallel to a slow axis of the non-linear optical element 303 and components that are parallel to a fast axis of the non-linear optical element 303 is 1:1. A half-wave plate, for example, can be used as the input-side polarization plane adjustment portion 301. The second output light S501b whose polarization plane has been adjusted is sent to the non-linear optical element 303.

The non-linear optical element 303 amplifies the signal light by parametric amplification based on the relative phase between the signal light, the pump light and the idler light. Further, in the non-linear optical element 303, the idler light is also amplified by an amplification gain corresponding to the amplification gain of the signal light.

Here, since the intermediate portion 200 performs exchange between the orthogonal polarization components for the idler light, the x component of noise of the signal light and the x component of noise of the idler light are uncorrelated in the second output light S501b. Further, the y component of the noise of the signal light and the y component of the noise of the idler light are uncorrelated. Therefore, in the parametric amplification in the non-linear optical element 303, although the signal light is amplified by a predetermined amplification gain based on the relative phase, the noise is not amplified by the amplification gain. As a result, the amplification gain of the noise of the signal light is smaller than the amplification gain of the signal light. Note that the amplification gain of the signal light and the amplification gain of the noise of the signal light will be described in detail later.

It is preferable that the non-linear optical element 303 is a highly non-linear fiber that has polarization maintaining characteristics, for example. In order to obtain a sufficient amplification gain by the parametric amplification, it is preferable that the non-linear optical element 303 has a structure in which the non-linear constant is, for example, equal to or more than $10\ W^{-1}km^{-1}$, its length is approximately 100 m to 1000 m, the zero-dispersion wavelength exists in the vicinity of the wavelength of the pump light, and the dispersion slope is small. Further, in order to compensate for polarization mode dispersion that occurs in the highly non-linear fiber, it is preferable that the highly non-linear fiber used as the non-linear optical element 303 is divided at a point at which the overall length is halved, and one of the divided halves of the highly non-linear fiber is rotated by 90 degrees and connected at the point of division.

Mixed light that includes the signal light and the idler light amplified by the non-linear optical element 303 and the pump light is sent to the output-side polarization plane adjustment portion 305.

The output-side polarization plane adjustment portion 305 matches the polarization planes of the signal light, the pump light and the idler light included in the mixed light with a slow axis of an input port (not shown in the drawings) of the demultiplexing portion 330, which will be described later. For example, a half-wave plate can be used as the output-side polarization plane adjustment portion 305.

The mixed light that includes the signal light, the pump light and the idler light whose polarization planes have been adjusted by the output-side polarization plane adjustment portion 305 is output from the second optical amplification portion 300 as third output light (shown by an arrow S601 in FIG. 1).

The third output light S601 output from the second optical amplification portion 300 is sent to the demultiplexing portion 330.

The demultiplexing portion 330 demultiplexes the third output light S601 into the signal light, the pump light and the idler light. For example, a WDM coupler/divider can be used as the demultiplexing portion 330.

The signal light (shown by an arrow S701 in FIG. 1) obtained by demultiplexing is sent to an output port 350 and is output from the first optical amplification device 10.

Further, the idler light (shown by an arrow S703 in FIG. 1) is sent to the phase shifter controller 370.

Note that the pump light is not necessary after it is output from the second optical amplification portion 300. Therefore, for example, the pump light may be blocked by the demultiplexing portion 330 or may be sent from the demultiplexing portion 330 to another path (not shown in the drawings) and emitted.

The phase shifter controller 370 includes, for example, an intensity detecting unit and a control signal generating unit (which are not shown in the drawing).

The intensity detecting unit of the phase shifter controller 370 detects an intensity of the input idler light S703. As explained above, in the second optical amplification portion 300, the idler light is amplified by the amplification gain corresponding to the amplification gain of the signal light.

Therefore, when the amplification gain of the idler light is maximum, the amplification gain of the signal light is also maximum. The phase shifter controller 370 uses the intensity detecting unit to detect the intensity of the idler light S703, and thereby determines the relative phase of the second output light S501b at which the intensity of the idler light is maximum. Then, the phase shifter controller 370 uses the control signal generating unit to generate the control signal S801 that notifies the relative phase at which the intensity of the idler light is maximum, and sends the generated control signal S801 to the above-described optical phase shifter 203.

As explained above, in the first optical amplification device 10, the mutually orthogonal polarization components (here, the x component and the y component) of the idler light are exchanged by the polarization plane adjustment portion 209 of the intermediate portion 200. At this time, the x component and the y component of the noise are also exchanged in the wavelength band of the idler light. The x components and the y components of the signal light and the idler light are equivalent to each other. Therefore, even after the x component and the y component of the idler light have been exchanged, the x component of the signal light and the x component of the idler light correspond to each other. Further, the y component of the signal light and the y component of the idler light correspond to each other. In contrast to this, both the x and y components of the noise of the signal light and the noise of the idler light are uncorrelated. Therefore, in the second optical amplification portion 300, although the signal light is amplified by the predetermined amplification gain based on the relative phase, the noise is not amplified by the predetermined amplification gain. As a result, the amplification of the noise existing in the wavelength band of the signal light is reduced in the second optical amplification portion 300. Therefore, in comparison with the known PIA-PSA cascade method, it is possible to reduce the noise figure. Note that the corresponding relationship between the signal light and the idler light and the corresponding relationship between the noise of the signal light and the noise of the idler light will be described in detail later.

Further, the third output light S601 output from the second optical amplification portion 300 is demultiplexed by the demultiplexing portion 330 in the first optical amplification device 10, and only the signal light S701 is output from the first optical amplification device 10. Therefore, the pump light and the idler light are not added to the signal light output from the first optical amplification device 10. As a result, in an optical communication network, for example, it is possible to prevent problems, such as a reduction of frequency use efficiency that occurs when the pump light and the idler light are output together with the signal light, and fiber fuse that occurs due to an excessive increase in the optical intensity.

Note that, here, a structural example is explained in which the single second optical amplification portion 300 that functions as the PSA is provided. However, for example, a structure that includes two second optical amplification portions may be adopted (this structure is not shown in the drawings). In this case, a polarization beam splitter, for example, is used to demultiplex the second output light S501b into the x component and the y component before the second output light S501b is input to the second optical amplification portions. Then, the x component and y component obtained by demultiplexing are respectively input to the second amplification portions, thus amplifying the signal light. As described above, in each of the polarization components input to the second amplification portion, the noise of the signal light and the noise of the idler light are uncorrelated. Therefore, although both the polarization components of the signal light are amplified by the predetermined amplification gain, the noise of the signal light is not amplified by the predetermined amplification gain. After that, the third output light of each of the polarization components output from each of the second optical amplification portions is multiplexed using a polarization beam splitter, for example.

Principle

The principle by which the noise figure is reduced in the first optical amplification device 10 will be explained.

First, the noise figure in an optical amplification device that uses the above-described known PIA-PSA cascade method (refer to R. Tang et al., "Gain Characteristics of a frequency nondegenerate phase-sensitive fiber-optic parametric amplifier with phase self-stabilized input" Optics Express, vol. 13, no. 26, p. 10483, 2005) will be explained.

In the known PIA-PSA cascade method, the amplification gain of the signal light in the PIA is denoted as $G_1$.

In the PIA, the signal light is amplified by the amplification gain $G_1$, and the idler light is generated at a wavelength conversion efficiency $E_1$. The idler light is complex conjugate light of the signal light, and the signal light and the idler light are correlated.

Here, if the intensity of the signal light input to the PIA is denoted as $P_{Si}$, the intensity of the signal light output from the PIA is denoted as $P_{So}$, and the intensity of the idler light generated by the PIA is denoted as $P_{Io}$, the wavelength conversion efficiency $E_1$ and the amplification gain $G_1$ of the signal light are defined by the following Formulas (1) and (2).

$$E_1 = \frac{P_{Io}}{P_{Si}} \quad (1)$$

$$G_1 = \frac{P_{So}}{P_{Si}} \quad (2)$$

The intensity $P_{So}$ of the signal light output from the PIA is a sum of the intensity $P_{Si}$ of the signal light input to the PIA and the intensity of an amplified part of the signal light in the PIA. Therefore, if the intensity of the signal light that is amplified in the PIA is denoted as $P_{Sa}$, the above Formula (2) can be transformed into the following Formula (3).

$$G_1 = \frac{(P_{Si} + P_{Sa})}{P_{Si}} = 1 + \frac{P_{Sa}}{P_{Si}} \quad (3)$$

In the parametric amplification in the PIA, one photon of signal light and one photon of idler light are generated from two photons of pump light. Therefore, the intensity $P_{Sa}$ of the amplified part of the signal light in the PIA is the same as the intensity $P_{Io}$ of the idler light generated by the PIA. Therefore, $P_{Io}/P_{Si}$ in the above Formula (1) is equivalent to $P_{Sa}/P_{Si}$ in the above Formula (3). Therefore, from the above Formula (1) and Formula (3), the wavelength conversion efficiency $E_1$ can be expressed as the following Formula (4).

$$E_1 = G_1 - 1 \quad (4)$$

Further, in the PIA, the noise existing in the wavelength band of the signal light is amplified by the amplification gain $G_1$ of the signal light.

Further, when the noise existing in the wavelength band of the idler light is wavelength-converted to the wavelength band of the signal light, noise is generated. The conversion efficiency of the noise corresponds to the wavelength conversion efficiency $E_1$ expressed by the above Formula (4).

A total amount of the noise of the signal light in the PIA is determined by the above-described two noise components. In the PIA, the noise of the signal light and the noise of the idler light are uncorrelated. Therefore, the above-described two noise components are also uncorrelated. Therefore, an amplification gain A of the noise of the signal light in the PIA is expressed by the following Formula (5) by adding the amplification gain $G_1$ of the signal light and the wavelength conversion efficiency $E_1$ (namely, $G_1-1$) of the idler light.

$$A=(\sqrt{G_1})^2+(\sqrt{G_1-1})^2 \qquad (5)$$

As explained above, the noise figure of the optical amplifier is the ratio of the SNR of the input light with respect to the SNR of the output light. Here, the noise figure can be expressed as the ratio of the amplification gain of the noise of the signal light with respect to the amplification gain of the signal light. Therefore, a noise figure $R_{N1}$ in the PIA is expressed as the following Formula (6).

$$R_{N1} = \frac{(\sqrt{G_1})^2 + (\sqrt{G_1-1})^2}{G_1} \qquad (6)$$

Here, in order to amplify the signal light in the optical communication network, let us consider a case in which the optical amplification devices are arranged at approximately 80 km intervals, for example. Attenuation of the intensity that occurs when the signal light propagates along an 80 km optical fiber is approximately 16 to 24 dB. In order to compensate for the attenuation, when the amplification gain in the optical amplification devices is set to approximately 16 to 24 dB, the amplification gain $G_1$ is sufficiently larger than 1. Therefore, the value ($G_1-1$) can come close to the amplification gain $G_1$. For that reason, from the above Formula (6), the noise figure $R_{N1}$ in the PIA becomes equal to 2 (namely, 3 dB).

Note that, in the PIA, the noise of the idler light is also amplified in a similar manner to the noise of the signal light. More specifically, the noise of the idler light output from the PIA includes a component of the input light S201 that is obtained by the noise existing in the wavelength band of the idler light being amplified by the amplification gain $G_1$, and a component of the input light S201 (refer to FIG. 1) that is obtained by the noise existing in the wavelength band of the signal light being wavelength-converted to the wavelength band of the idler light at the wavelength conversion efficiency $E_1$ (namely, $G_1-1$). Therefore, the noise of the idler light and the noise of the signal light are correlated in the first output light S301 (refer to FIG. 1) that is output from the PIA.

In the known PIA-PSA cascade method, when the intensity of the idler light in the PSA is set to 0, the amplification gain of the signal light is denoted as $G_2$.

Also in the PSA, idler light is generated as wavelength converted light. The wavelength conversion efficiency of the idler light in the PSA is similar to the wavelength conversion efficiency in the above-described PIA, and is set to $G_2-1$.

The signal light output from the PSA includes a component obtained by the signal light input to the PSA being amplified by the amplification gain $G_2$, and a component obtained by the idler light input to the PSA being wavelength-converted to the wavelength band of the signal light at the wavelength conversion efficiency $G_2-1$. In the PIA-PSA cascade method, the second output light S501a (refer to FIG. 1) input to the PSA includes the idler light generated as the wavelength converted light in the PIA. Therefore, the above-described two components included in the signal light output from the PSA are correlated. Thus, if it is assumed that the intensities of the signal light and the idler light input to the PSA are the same, an amplification gain B of the signal light in the PSA is expressed by the following Formula (7) when it is maximum.

$$B=(\sqrt{G_2}+\sqrt{G_2-1})^2 \qquad (7)$$

Further, in the known PIA-PSA cascade method, the noise of the idler light and the noise of the signal light input to the PSA are correlated. Therefore, an amplification gain C of the noise existing in the wavelength band of the signal light becomes equal to the amplification gain of the signal light. That is, the amplification gain C is expressed by the following Formula (8).

$$C=(\sqrt{G_2}+\sqrt{G_2-1})^2 \qquad (8)$$

Accordingly, in the known PIA-PSA cascade method, a noise figure $R_{N2}$ in the PSA is expressed by the following Formula (9).

$$R_{N2} = \frac{C}{B} = \frac{(\sqrt{G_2} + \sqrt{G_2-1})^2}{(\sqrt{G_2} + \sqrt{G_2-1})^2} = 1 \qquad (9)$$

The noise figure $R_{N2}$ in the PSA becomes equal to 1 (namely, 0 dB).

As explained above, in the known PIA-PSA cascade method, the noise figure in the PIA is 3 dB and the noise figure in the PSA is 0 dB. Therefore, the noise figure of the entire optical amplification device is at least 3 dB or more.

Next, the noise figure in the first optical amplification device 10 will be explained.

The first output light S301 and the second output light S501a will be explained with reference to FIG. 2A and FIG. 2B.

Figure 2A:
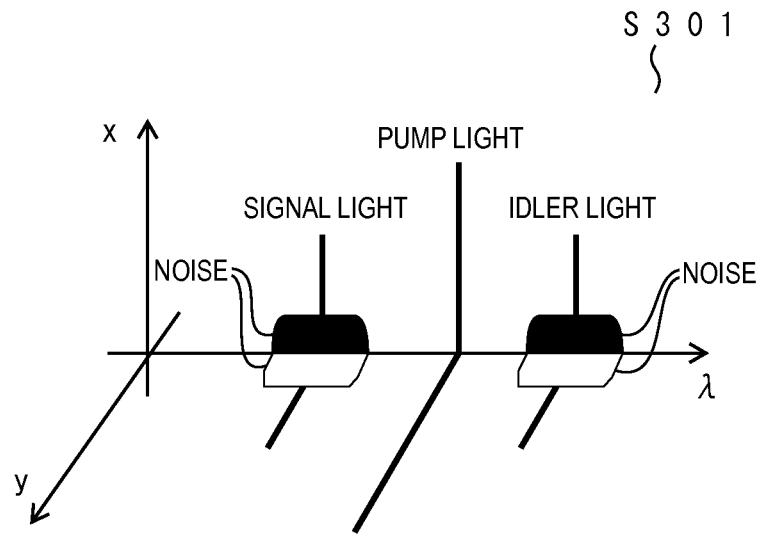
FIG. 2A is a diagram illustrating first output light and second output light.

FIG. 2A is a diagram showing the signal light, the pump light and the idler light included in the first output light S301, and noise included in each of their wavelength bands. In FIG. 2A, intensities of respective polarization components (here, referred to as x components and y components), which are orthogonal to each other, of the signal light, the pump light and the idler light are shown by an arbitrary unit. Further, the wavelength is shown by an arbitrary unit on an axis that is orthogonal to an x-y plane.

As described above, in the input-side polarization plane adjustment portion 101, the polarization planes of the signal light and the pump light are adjusted to a 45 degree linear polarization with respect to the slow axis of the non-linear optical element 103. Therefore, among the polarization components of the signal light and the pump light included in the first output light S301, the x components are along the slow axis of the optical element 103 and the y components are along the fast axis of the non-linear optical element 103. Then, the x components and the y components of the signal light and the pump light have intensities that are equivalent to each other. Further, the polarization components of the idler light generated as wavelength converted light of the signal light correspond to the x component and the y component of the signal light.

Noise existing in the wavelength band of the signal light (hereinafter also referred to as noise of the signal light) exists such that the noise does not correlate with each of the x component and the y component of the signal light.

Noise existing in the wavelength band of the idler light (hereinafter also referred to as noise of the idler light) is generated corresponding to the noise of the signal light.

Therefore, the x component of the noise of the idler light corresponds to the x component of the noise of the signal light, and the y component of the noise of the idler light corresponds to the y component of the noise of the signal light.

Figure 2B:
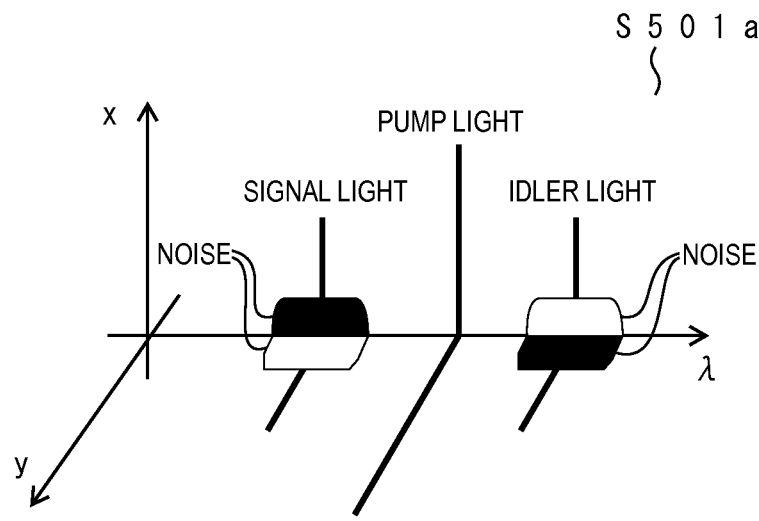
FIG. 2B is a diagram illustrating first output light and second output light.

FIG. 2B is a diagram showing noise included in the wavelength band of each of the signal light, the pump light and the idler light included in the second output light S501a. In FIG. 2B, intensities of respective polarization components (here, referred to as x components and y components), which are orthogonal to each other, of the signal light, the pump light and the idler light are shown by an arbitrary unit. Further, the wavelength is shown by an arbitrary unit on an axis that is orthogonal to an x-y plane.

As described above, the mutually orthogonal polarization components (here, the x component and the y component) of the idler light are exchanged by the polarization plane adjustment portion 209 of the intermediate portion 200. As a result, in the wavelength band of the idler light, the x component and the y component of the noise are also exchanged.

In the first output light S301 input to the intermediate portion 200, the x component of the noise of the idler light corresponds to the x component of the noise of the signal light, and the y component of the noise of the idler light corresponds to the y component of the noise of the signal light (refer to FIG. 2A). On the other hand, in the second output light S501a output from the intermediate portion 200, the x component and the y component of the idler light and the noise of the x component and the noise of the y component of the idler light are respectively exchanged. Therefore, the x component of the noise of the signal light does not correlate with the x component of the noise of the idler light. Further, the y component of the noise of the signal light does not correlate with the y component of the noise of the idler light.

Further, as described above, the x components and the y components of the signal light and the idler light are equivalent to each other. Therefore, even after the x component and the y component of the idler light have been exchanged, the x component of the signal light and the x component of the idler light correspond to each other. Further, the y component of the signal light and the y component of the idler light correspond to each other.

The noise figure of the first optical amplification portion 100 that functions as the PIA is the same as that of the PIA of the known PIA-PSA cascade method, and is 3 dB.

In the second optical amplification portion 300 that functions as the PSA, the amplification gain of the signal light due to the intensity applied from the pump light is denoted as $G_2$.

As explained above, in the first optical amplification device 10, the mutually orthogonal polarization components (here, the x component and the y component) of the idler light are exchanged by the intermediate portion 200. As a result, in the wavelength band of the idler light, the x component and the y component of the noise are also exchanged. The x components and the y components of the signal light and the idler light are equivalent to each other. Therefore, even after the x component and the y component of the idler light have been exchanged, the x component of the signal light and the x component of the idler light correspond to each other (in other words, they are correlated to each other). Further, the y component of the signal light and the y component of the idler light correspond to each other (in other words, they are correlated to each other). In contrast to this, both the x and y components of the noise of the signal light and the noise of the idler light are uncorrelated.

Therefore, the signal light output from the second optical amplification portion 300 is amplified by the amplification gain B expressed by the above Formula (7), in a similar manner to the PSA of the known PIA-PSA cascade method.

In contrast to this, the noise of the signal light output from the PSA is also amplified by an amplification gain that is the same as the above-described amplification gain A. More specifically, an amplification gain D of the signal light output from the PSA is expressed by the following Formula (10)

$$D=(\sqrt{G_2})^2+(\sqrt{G_2-1})^2 \tag{10}$$

As a result, in the first optical amplification device 10, a noise figure $R_{N3}$ in the PSA is expressed by the following Formula (11).

$$R_{N3} = \frac{(\sqrt{G_2})^2 + (\sqrt{G_2-1})^2}{(\sqrt{G_2} + \sqrt{G_2-1})^2} \tag{11}$$

In a similar manner to the known PIA-PSA cascade method, if the amplification gain in the first optical amplification device 10 is set to approximately 16 to 24 dB, for example, the value $(G_2-1)$ can come close to the amplification gain $G_2$. For that reason, from the above Formula (11), the noise figure $R_{N3}$ in the PSA becomes equal to ½ (namely, −3 dB).

As explained above, in the first optical amplification device 10, the noise figure in the PIA is 3 dB and the noise figure in the PSA is −3 dB. Therefore, the noise figure of the entire first optical amplification device 10 is 0 dB at best.

In this manner, in the first optical amplification device 10, the noise figure in the second optical amplification portion 300 can be reduced. It is therefore possible to reduce the noise figure of the entire first optical amplification device 10 as compared to the known PIA-PSA cascade method.

Second Embodiment

Figure 3:
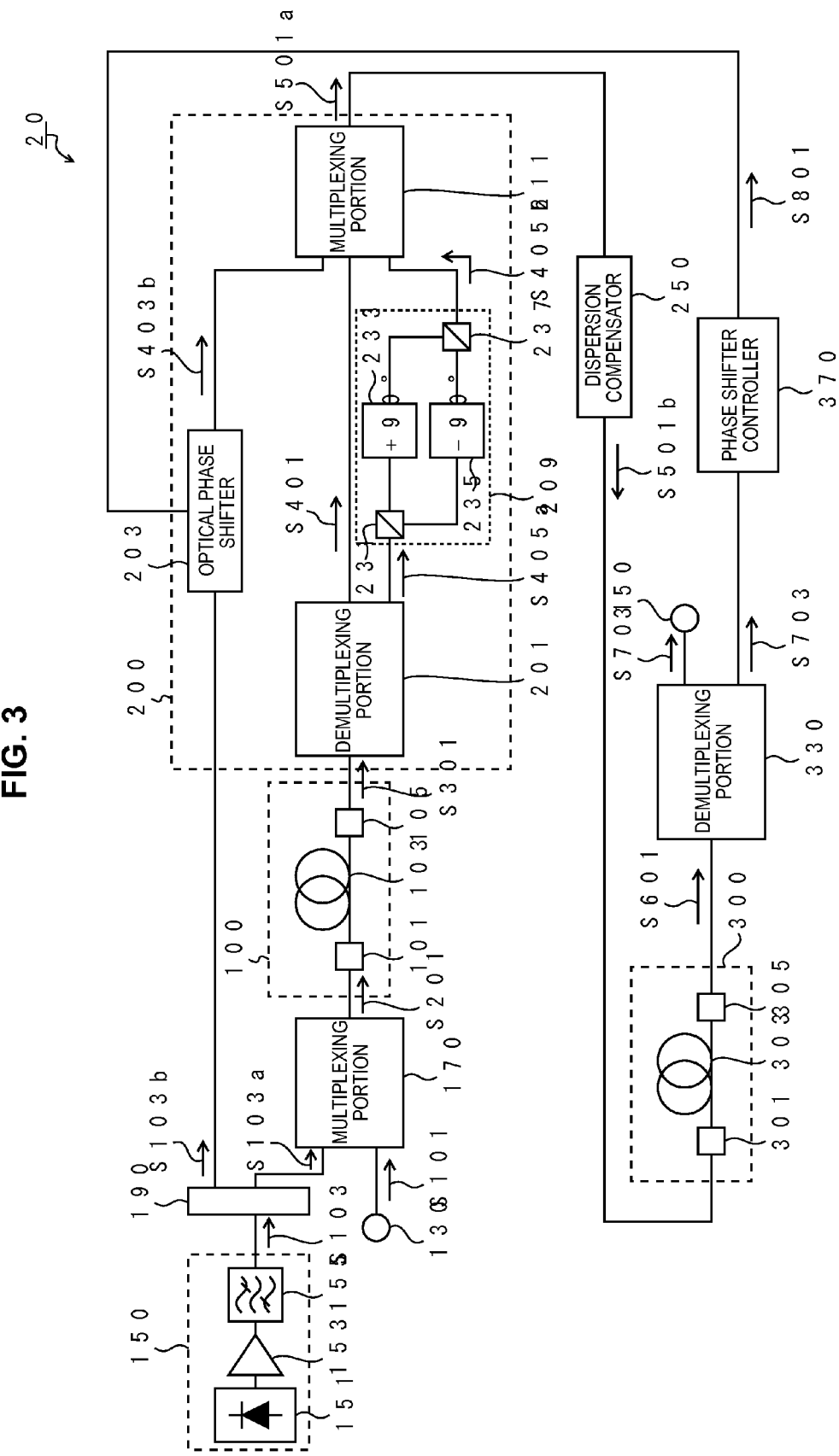
FIG. 3 is a schematic structural diagram schematically showing a second optical amplification device according to the present invention.

An optical amplification device (hereinafter referred to as a second optical amplification device) according to a second embodiment of the present invention will be explained with reference to FIG. 3. FIG. 3 is a schematic structural diagram schematically showing the second optical amplification device. In FIG. 3, respective structural elements are connected by lines, which schematically show transmission paths through which signals propagate. The respective structural elements may be connected by an optical fiber or an optical waveguide, for example, or may be connected by so-called free space optics.

The second optical amplification device 20 includes a pump light branching portion 190 between the pump light source 150 and the multiplexing portion 170, in addition to the structural elements of the above-described first optical amplification device 10.

The pump light branching portion 190 branches the pump light S103 generated by the pump light source 150. The branched pump light (S103a) is sent to the multiplexing portion 170 and the branched pump light (S103b) is sent to the optical phase shifter 203.

In a similar manner to the above-described first optical amplification device 10, the optical phase shifter 203 adjusts the phase of the pump light S103b based on the control signal S801 sent from the phase shifter controller 370 so that the relative phase between the signal light, the pump light and the idler light given by $2\phi_p-\phi_s-\phi_i$ is constant. Note that $\phi_p$ indicates the phase of the pump light, $\phi_s$ indicates the phase of the signal light, and $\phi_i$ indicates the phase of the idler light, respectively. Note that attenuation of the intensity of the pump light 103b in the second optical amplification device 20 is small because the pump light 103b is input to the optical phase shifter 203 without passing through elements, such as the multiplexing portion 170, the first optical amplification portion 100 and the demultiplexing portion 201 etc. Therefore, in the structural example shown in FIG. 3, the optical amplifier and the band-pass filter are omitted, which are provided at a later stage of the optical phase shifter 203 in the above-described first optical amplification device 10. As a result, it is possible to reduce the noise of the pump light included in the second output light S501a, as compared to the case of the first optical amplification device 10. Thus, a reduction in deterioration of the noise figure that occurs by transfer of the noise of the pump light to the signal light can be anticipated.

Further, in the second optical amplification device 20, the demultiplexing portion 201 blocks the pump light included in the first output light S301, and respectively outputs the signal light S401 and the idler light S405a obtained by demultiplexing. Then, the multiplexing portion 211 multiplexes the pump light S403b, the signal light S401 and the idler light S405b whose phases have been adjusted by the optical phase shifter 203, and thereby generates the second output light S501a.

Similar effects to those of the first optical amplification device 10 can be obtained by the second optical amplification device 20. A redundant explanation of the structural elements and the signals that are common to those of the above-described first optical amplification device 10 will be omitted.

Modified Example

A modified example of the optical amplification device according to the present invention will be explained with reference to FIG. 4. In this modified example, the first optical amplification portion 100 and the second optical amplification portion 300 of the above-described first optical amplification device 10 and the second optical amplification device 20 have a structure that uses periodically poled lithium niobate (PPLN) as a non-linear optical element. The other structural elements are the same as those of the first optical amplification device 10 and the second optical amplification device 20 described above, and redundant explanations of common structural elements and signals will thus be omitted.

Figure 4:
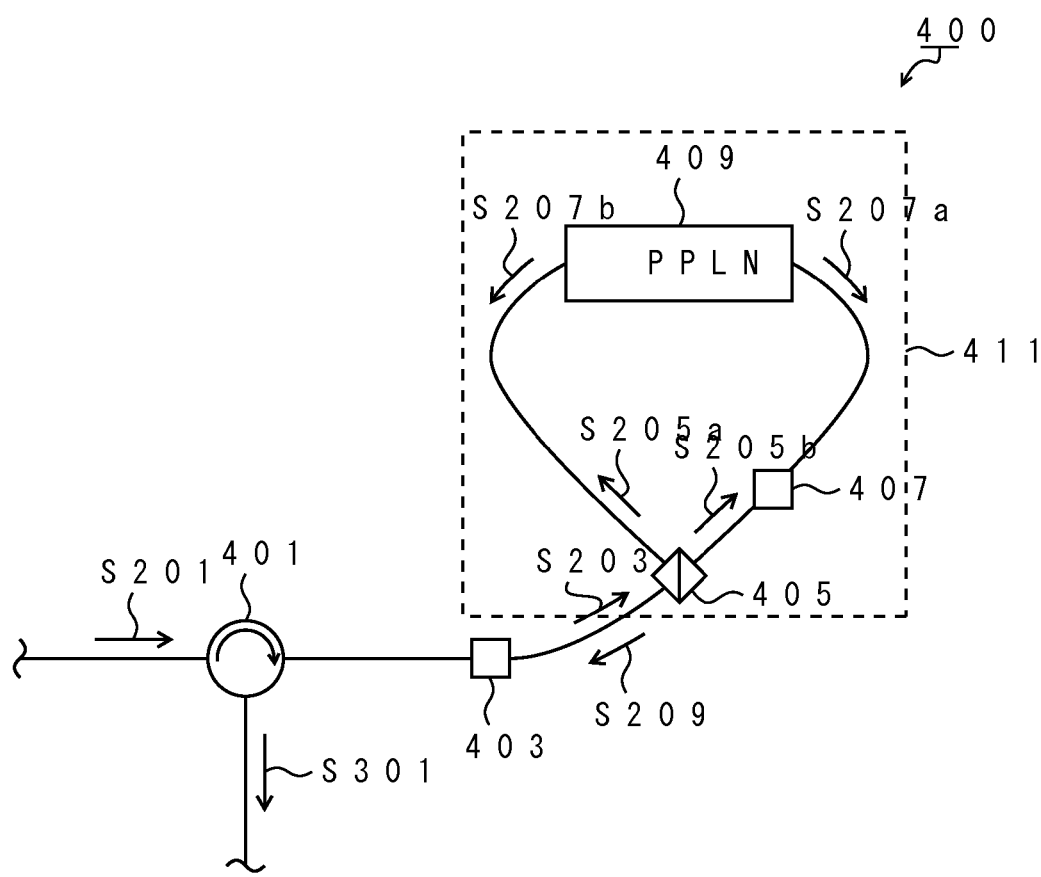
FIG. 4 is a schematic structural diagram showing an optical amplification portion that is used in a modified example of the optical amplification device.

FIG. 4 is a schematic structural diagram showing an optical amplification portion that is used in the modified example of the optical amplification device. Note that, in FIG. 4, the respective structural elements are connected by lines, which schematically show transmission paths through which signals propagate. The respective structural elements may be connected by an optical fiber or an optical waveguide, for example, or may be connected by so-called free space optics.

Here, a case will be explained in which an optical amplification portion 400 according to the modified example is used in place of the first optical amplification portion 100 of the first optical amplification device 10 and the second optical amplification device 20 described above.

The optical amplification portion 400 is provided with a circulator 401, a first polarization plane adjustment portion 403 and a loop optical path 411 that includes a polarization beam splitter 405, a second polarization plane adjustment portion 407 and a non-linear optical element 409.

The input light S201 output from the above-described multiplexing portion 170 is input to the optical amplification portion 400. Then, the input light S201 is sent to the first polarization plane adjustment portion 403 via the circulator 401.

The first polarization plane adjustment portion 403 adjusts the polarization planes of the signal light and the pump light included in the input light S201 such that an intensity branching ratio in the polarization beam splitter 405 is 1:1. As a result, the intensity ratio of components that are parallel to a slow axis of the non-linear optical element 409 and components that are parallel to a fast axis of the non-linear optical element 409 is 1:1. A half-wave plate, for example, can be used as the first polarization plane adjustment portion 403. Input light (shown by S203 in FIG. 4) whose polarization plane has been adjusted by the first polarization plane adjustment portion 403 is sent to the polarization beam splitter 405.

The polarization beam splitter 405 demultiplexes the signal light and the pump light included in the input light S203 respectively into mutually orthogonal polarization components at an intensity ratio of 1:1. Then, the polarization beam splitter 405 causes one (shown by S205a in FIG. 4) of the polarization component lights obtained by demultiplexing to propagate through the loop optical path 411 in a clockwise direction, and causes the other polarization component light (shown by S205b in FIG. 4) to propagate through the loop optical path 411 in a counterclockwise direction.

First, the path of the polarization component light S205a will be explained.

The polarization component light S205a, which is the one polarization component light obtained by demultiplexing by the polarization beam splitter 405, propagates through the loop optical path 411 in the clockwise direction, and is input to the non-linear optical element 409. The polarization component light S205a is in a polarization state in which a second harmonic generation/differential frequency generation (SHG/DFG) cascade wavelength conversion efficiency is maximum in the non-linear optical element 409 that is formed of PPLN.

The non-linear optical element 409 amplifies the signal light included in the polarization component light S205a by parametric amplification. Further, based on the wavelengths of the signal light and the pump light, the non-linear optical element 409 generates idler light as wavelength converted light. As explained above, here, PPLN is used as the non-linear optical element 409. Mixed light (shown by S207a in FIG. 4) that includes the signal light, the pump light, and the idler light that is generated by the non-linear optical element 409 is sent to the second polarization plane adjustment portion 407.

The second polarization plane adjustment portion 407 rotates the polarization plane of the mixed light S207a by 90 degrees. For example, a half-wave plate can be used as the second polarization plane adjustment portion 407. The mixed light S207a that has passed through the second polarization plane adjustment portion 407 is sent to the polarization beam splitter 405.

Next, the path of the other polarization component light S205b will be explained.

The other polarization component light S205b obtained by demultiplexing by the polarization beam splitter 405 propagates through the loop optical path 411 in the counterclockwise direction, and is input to the second polarization plane adjustment portion 407. The second polarization plane adjustment portion 407 rotates the polarization plane of the polarization component light S205b by 90 degrees. As a result, the polarization component light S205b is in a polarization state in which the SHG/DFG cascade wavelength conversion efficiency is maximum in the non-linear optical element 409. The polarization component light S205b that has passed through the second polarization plane adjustment portion 407 is sent to the non-linear optical element 409.

The non-linear optical element 409 amplifies the signal light included in the polarization component light S205b by parametric amplification. Further, based on the wavelengths of the signal light and the pump light, the non-linear optical element 409 generates idler light as wavelength converted light. Mixed light (shown by S207b in FIG. 4) that includes the signal light, the pump light, and the idler light that is generated by the non-linear optical element 409 is sent to the polarization beam splitter 405.

The polarization beam splitter 405 multiplexes the mixed light S207a and the mixed light S207b that have propagated through the loop optical path 411, and thereby generates first output light S209. The generated first output light S209 is sent to the first polarization plane adjustment portion 403.

The first polarization plane adjustment portion 403 rotates the polarization planes of the signal light, the pump light and the idler light included in the first output light S209 by 45 degrees. Due to the rotation of the polarization planes, the polarization plane of the first output light S209 is matched with the slow axis of the input port (not shown in the drawings) of the above-described demultiplexing portion 201. First output light (shown by S301 in FIG. 4) whose polarization plane has been rotated by the first polarization plane adjustment portion 403 passes through the circulator 401 and is output from the optical amplification portion 400. The first output light S301 corresponds to the first output light S301 output from the first optical amplification portion 100 in the first optical amplification device 10 and the second optical amplification device 20 described above.

In the optical amplification portion 400 of this modified example, PPLN is used as the non-linear optical element 409 that performs the parametric amplification. As a result, noise due to spontaneous Raman emission is not added, unlike a case in which a highly non-linear fiber, for example, is used as the non-linear optical element. Therefore, the use of PPLN is advantageous in reducing the noise of the signal light. Further, when PPLN is used, stimulated Brillouin scattering does not occur, and thus it is not necessary to provide a phase modulation unit to reduce stimulated Brillouin scattering.

Note that the optical amplification portion 400 of this modified example can also be used instead of the second optical amplification portion 300 in the first optical amplification device 10 and the second optical amplification device 20 described above. In this case, in order to cause the optical amplification portion 400 to function as the PSA, the non-linear coefficient of the non-linear optical element 409 is adjusted such that the amplification gain of the signal light is determined in accordance with the relative phase between the signal light, the pump light and the idler light.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. An optical amplification device comprising:
a first optical amplification portion that generates idler light as wavelength converted light based on wavelengths of signal light and pump light included in input light, and outputs first output light that includes signal light, pump light and idler light;
an intermediate portion that generates second output light by exchanging mutually orthogonal polarization components of idler light included in the first output light; and
a second optical amplification portion that amplifies an intensity of signal light included in the second output light.

2. The optical amplification device according to claim 1, further comprising:
a phase adjustment portion that is capable of changing a relative phase of signal light, pump light and idler light input to the second optical amplification portion,
wherein the second optical amplification portion amplifies the intensity of the signal light based on the relative phase.

3. The optical amplification device according to claim 2,
wherein the intermediate portion includes a demultiplexing portion, a polarization plane adjustment portion and a multiplexing portion,
wherein the demultiplexing portion demultiplexes the first output light into signal light, pump light and idler light, sends the signal light to the multiplexing portion, sends the idler light to the polarization plane adjustment portion, and sends the pump light to the multiplexing portion via the phase adjustment portion,
wherein the polarization plane adjustment portion is provided between the demultiplexing portion and the multiplexing portion, exchanges the mutually orthogonal polarization components of idler light, and sends the idler light to the multiplexing portion, and
wherein the multiplexing portion multiplexes signal light, pump light and idler light and thereby generates the second output light.

4. The optical amplification device according to claim 2, further comprising:
a pump light branching portion that is provided at a stage preceding the first optical amplification portion,
wherein the intermediate portion includes a demultiplexing portion, a polarization plane adjustment portion and a multiplexing portion,
wherein the demultiplexing portion demultiplexes the first output light into signal light, pump light and idler light, sends the signal light to the multiplexing portion, sends the idler light to the polarization plane adjustment portion, and blocks the pump light,
wherein the polarization plane adjustment portion is provided between the demultiplexing portion and the multiplexing portion, exchanges the mutually orthogonal polarization components of idler light, and sends the idler light to the multiplexing portion,
wherein the multiplexing portion multiplexes signal light, pump light and idler light and thereby generates the second output light, and
wherein the pump light branching portion branches pump light, sends the branched pump light to the first optical amplification portion, and sends the branched pump light to the phase adjustment portion.

5. The optical amplification device according to any one of claim 1,
wherein the polarization plane adjustment portion includes a first polarization beam splitter, a first half-wave plate, a second half-wave plate and a second polarization beam splitter,
wherein the first polarization beam splitter demultiplexes idler light into mutually orthogonal polarization components, sends one of the polarization component lights to the first half-wave plate, and sends the other polarization component light to the second half-wave plate,
wherein the first half-wave plate rotates a polarization plane of the one polarization component light by 90 degrees, and sends the one polarization component light to the second polarization beam splitter,
wherein the second half-wave plate rotates a polarization plane of the other polarization component light by −90 degrees, and sends the other polarization component light to the second polarization beam splitter, and wherein the second polarization beam splitter multiplexes the one polarization component light that is sent from the first half-wave plate and the other polarization component light that is sent from the second half-wave plate.

6. The optical amplification device according to any one of claim 1,
wherein the first optical amplification portion and the second optical amplification portion each include an input-side polarization plane adjustment portion and a non-linear optical element, and
wherein the input-side polarization plane adjustment portion adjusts a polarization plane of input light such that an intensity ratio of a component that is parallel to a slow axis of the non-linear optical element to a component that is parallel to a fast axis of the non-linear optical element is one to one, and sends the light whose polarization plane has been adjusted to the non-linear optical element.

7. The optical amplification device according to any one of claim 1,
wherein the first optical amplification portion and the second optical amplification portion each include a first polarization plane adjustment portion and a loop optical path that includes a polarization beam splitter, a second polarization plane adjustment portion and a non-linear optical element,
wherein the first polarization plane adjustment portion adjusts a polarization plane of input light such that an intensity ratio of a component that is parallel to a slow axis of the non-linear optical element to a component that is parallel to a fast axis of the non-linear optical element is one to one, and sends the light whose polarization plane has been adjusted to the polarization beam splitter,
wherein the polarization beam splitter demultiplexes the light sent from the first polarization plane adjustment portion into mutually orthogonal polarization components, causes one of the polarization component lights to propagate through the loop optical path in a clockwise direction, causes the other polarization component light to propagate through the loop optical path in a counter-clockwise direction, and multiplexes the one polarization component light and the other polarization component light that have propagated through the loop optical path,
wherein the second polarization plane adjustment portion rotates polarization planes of the one polarization component light and the other polarization component light that propagate through the loop optical path by 90 degrees, and
wherein the non-linear optical element is periodically poled lithium niobate (PPLN).

8. An optical amplification method, comprising:
generating idler light as wavelength converted light based on wavelengths of signal light and pump light included in input light, and generating first output light that includes signal light, pump light and idler light;
generating second output light by exchanging mutually orthogonal polarization components of idler light included in the first output light; and
amplifying an intensity of signal light included in the second output light.

9. The optical amplification method according to claim 8,
wherein a relative phase of signal light, pump light and idler light is adjusted after the first output light is generated and before the second output light is generated, and
wherein the intensity of the signal light is amplified based on the relative phase, in the amplifying of the intensity of the signal light.

10. The optical amplification method according to claim 9, further comprising:
demultiplexing the first output light into signal light, pump light and idler light;
adjusting a phase of the pump light obtained by demultiplexing the first output light;
exchanging mutually orthogonal polarization components of the idler light obtained by demultiplexing the first output light; and
multiplexing the signal light obtained by demultiplexing the first output light, the pump light whose phase has been adjusted, and the idler light whose polarization components have been exchanged.

11. The optical amplification method according to claim 9, further comprising:
branching pump light before generating the first output light;
demultiplexing the first output light into signal light and idler light;
adjusting a phase of pump light;
exchanging mutually orthogonal polarization components of the idler light obtained by demultiplexing the first output light; and
multiplexing the signal light obtained by demultiplexing the first output light, the pump light whose phase has been adjusted, and the idler light whose polarization components have been exchanged,
wherein the branched pump light is used in generating the first output light, and in adjusting the phase of pump light.

12. The optical amplification method according to any one of claim 8, further comprising:
in generating the second output light,
demultiplexing the idler light into polarization component lights that are orthogonal to each other;
rotating a polarization plane of one of the polarization component lights by 90 degrees;
rotating a polarization plane of the other polarization component light by −90 degrees; and
multiplexing the one polarization component light whose polarization plane has been rotated by 90 degrees and the other polarization component light whose polarization plane has been rotated by −90 degrees.

* * * * *